UNITED STATES PATENT OFFICE.

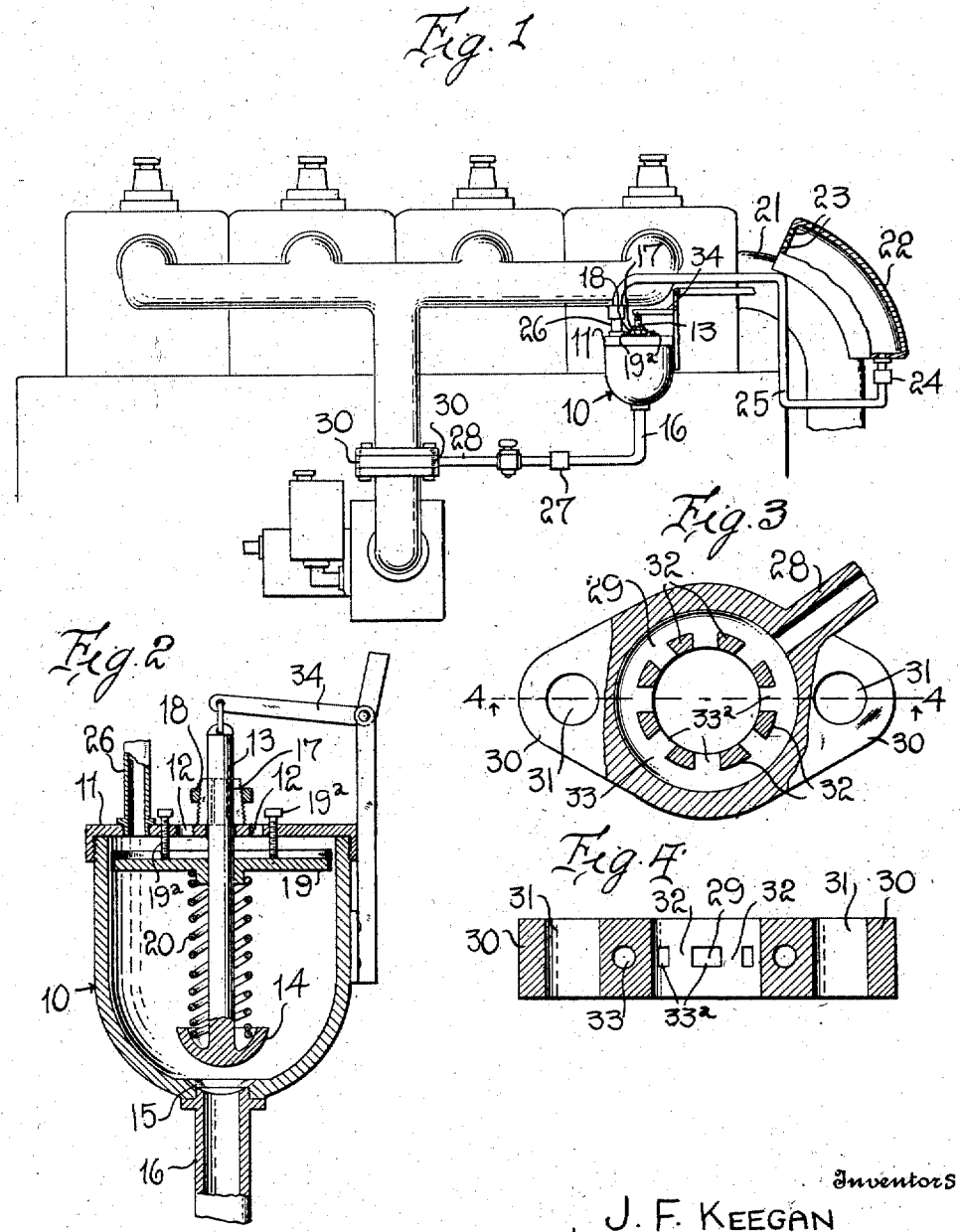

JOHN F. KEEGAN AND ROBERT D. WRIGHT, OF DAMASCUS, VIRGINIA, ASSIGNORS OF ONE-FOURTH TO S. W. MINTON, OF DAMASCUS, VIRGINIA.

AUXILIARY AIR CONTROLLER AND HEATER.

1,238,523. Specification of Letters Patent. Patented Aug. 28, 1917.

Application filed April 29, 1916. Serial No. 94,454.

*To all whom it may concern:*

Be it known that we, JOHN FRANCES KEEGAN and ROBERT DAVID WRIGHT, citizens of the United States, residing at Damascus, in the county of Washington and State of Virginia, have invented certain new and useful Improvements in Auxiliary Air Controllers and Heaters, of which the following is a specification, reference being had to the accompanying drawings.

This invention relates to automobile appliances, and particularly to appliances for heating auxiliary air before its passage into the carbureter and manifold of an internal combustion engine.

The particular object of the invention is to provide a simple device of this character in which outside air is mixed with air heated by contact with the exhaust manifold of the engine, and this body of slightly heated air carried to the manifold and in its course mixed with the charge passing from the carbureter.

A further object of the invention is the provision of means whereby the passage of the auxiliary air to the manifold and carbureter may be controlled in accordance with the position of the throttle of the engine, and a further object in this connection is to provide in combination with a valve controlled in accordance with the position of the throttle, an inlet valve which is automatically opened by the suction of the engine.

A further object of the invention is the provision of means whereby the inlet valve, which is normally opened by the suction of the engine, may be mechanically held open at all times, and a further object is to provide means by which the auxiliary air may be controlled either by the automatic valve or by a valve connected to the throttle of the engine and means whereby either of these valves may be held from operation, while the other valve is allowed to operate and control the passage of auxiliary air.

Other objects will appear in the course of the following description.

The invention is illustrated in the accompanying drawings, wherein;

Figure 1 is an elevation of an automobile engine with our auxiliary air heating and controlling means applied thereto;

Fig. 2 is a vertical transverse section through the valve chamber 10;

Fig. 3 is a plan view, partly in section, of the mixing chamber; and

Fig. 4 is a vertical section therethrough on the line 4—4 of Fig. 3.

Referring to the drawings, it will be seen that our attachment comprises a chamber 10 which is illustrated as cup-shaped in form, this chamber having a top 11 which may be detachably connected to the chamber in any suitable manner and is provided with the air inlet openings 12. The top or cover 11 has a central opening through which passes a valve spindle 13 carrying at its lower end a valve 14 adapted to engage with the seat 15 formed at the lower end of the chamber 10 and from which seat extends the outlet pipe 16. The valve spindle passes through a split bushing 17 engaged by a jam nut 18.

Loosely mounted upon the valve spindle 13 for vertical movement is an automatic valve 19 which is urged upward toward the top of the chamber 10 by means of a spring 20 so that this valve 19 normally closes the inlet openings 12. The suction of the engine, however, will draw this valve downward so as to remove it from the inlet openings and permit the inlet of air into the chamber 10. This valve may, however, be held in an open position against the action of the spring 20 by the screws 19ª as illustrated in Fig. 2.

Mounted in connection with the exhaust manifold 21 is a casing 22 which partially surrounds the exhaust manifold and is attached thereto in any suitable way and which has a number of air inlet openings 23. This hood or casing 22 is connected by means of a union 24 to a pipe 25 which is operatively connected to a short section of pipe 26 which extends into the top 11 of the chamber 10 and is normally closed by the valve 19. When the valve 19 is drawn downward by the suction of the engine it will disclose the opening of the pipe section 26 and hot air will be drawn into the chamber 10 along with the cold air through the openings 12. The pipe section 16 which extends downward from the lower end of the chamber 10 is connected by a union 27 to a nipple 28 extending outward from the wall of the chamber 29. This chamber has laterally disposed ears 30 through which are perforations 31 permitting the passage of bolts whereby this mixing chamber may be connected in the line between the carbureter of the engine and the pipe leading to the inlet manifold. Disposed within the mixing chamber are a plurality of baffles 32 which define an outlet passage 33, and perforations 33ª lead from this passage into the central portion of the chamber. These baffles act to thoroughly mix the auxiliary air with the fuel charge coming from the carbureter.

In order that the valve 14 shall be operated in consonance with the operation of the throttle, I mount upon the chamber 10 a bracket which pivotally carries the bell crank 34, one end of which is shackled, bolted, or otherwise operatively connected to the upper end of the valve spindle, while the other end of the bell crank is operatively connected to the throttle lever by any suitable means. It will thus be obvious that an opening of the throttle lever will cause the valve 14 to open to the same extent as the throttle valve is opened, thus increasing the amount of auxiliary air which passes through the pipe 16 to the engine. When the throttle valve is closed, the valve 14 moves downward to its seat.

In the practical operation of this device it is apparent that the valve 14 will be opened in accordance with the opening of the throttle valve, and that the valve 19 will be normally held up against the air inlet openings by the spring 20, but that upon each suction stroke of the engine the automatic valve 19 will open to allow the influx of cold air through the openings 12 and of warm air from the heating hood or chamber 22. This commingled warm and cold air will pass downward into the pipe 16 out through the openings between the baffles 32 and will be thoroughly mixed with the charge coming from the carbureter. By connecting the chamber 10 to the hood 22, which in turn partly surrounds the exhaust manifold, the automatic valve will start to permit the inlet of warm air and secure a circulation of this warm air as soon as the engine starts. The desirability of heating the auxiliary air before its passage into the carbureter is well known to all those who are skilled in the art.

It will further be seen that with this construction the valve 19 may either open automatically or be held open by the screws 19ª and that the valve 14 may either be held in a fixed position by the jam nut 18 acting on the bushing 17 or may be shifted freely through the bushing by the operation of the throttle connections. Thus the auxiliary air may be controlled either mechanically by means of the valve 14 or automatically by means of the valve 19 and that by this construction means is provided whereby only one of these valves can work at a time or whereby both of the valves can operate to a certain extent together.

Our device is very compact, provides for an automatic regulation of the auxiliary air and also for a regulation of the auxiliary air in correspondence with the position of the throttle.

Having described the invention, what we claim is:

1. An auxiliary air attachment for internal combustion engines comprising a chamber having air inlet openings at one end and a valve seat at the other end surrounding an outlet opening, a suction controlled valve controlling passage through the air inlet openings, a mechanically operated valve disposed with its axis in line with the axis of said valve seat and longitudinally movable toward or from the seat and controlling passage through the outlet opening, and means for adjustably holding the mechanically operated valve at any desired distance from the seat, the suction controlled valve being shiftable independently of the mechanically operated valve.

2. An auxiliary air attachment for internal combustion engines comprising a chamber having air inlet openings at one end and an outlet opening at the other end, a valve coacting with the outlet opening and having a valve stem passing loosely through the end of the chamber, means for mechanically operating the valve through the stem, a suction-operated valve loosely mounted upon the stem and controlling the air inlet openings, and a spring surrounding the stem and normally holding the suction valve to its seat.

3. An auxiliary air attachment for internal combustion engines comprising a chamber having an outlet opening at one end and an inlet opening at the opposite end, a mechanically shiftable valve controlling the outlet opening, and a suction operated valve controlling the inlet of air through the inlet opening and independently operable with relation to the mechanically operated valve and means for locking either valve in an open position.

4. An auxiliary air attachment for internal combustion engines including an auxiliary air pipe leading to the inlet manifold of the engine, an automatically operated suction valve controlling the passage of auxiliary air through the pipe, a mechanically operated valve controlling the passage of air through the valve, said valves being independently operable, means for holding the suction valve open and inoperative, and independent means for holding the mechanically operated valve open and inoperative.

5. An auxiliary air attachment including a valve casing having an outlet opening and an inlet opening, an automatically operated suction valve controlling the passage of air through the valve casing, a mechanically operated valve controlling the passage of air through the valve casing, said valves being independently operable, means on the valve casing for holding the suction operated valve open and inoperative, and independent means on the valve casing for holding the mechanically operated valve open and inoperative.

6. An auxiliary air attachment for internal combustion engines comprising a chamber having air inlet openings at one end and an outlet opening at the other, suction-operated means for controlling the passage of air through the air inlet openings, adjustable means for controlling the passage through the outlet opening, means for holding the suction-operated means in an open position, and means for locking the adjustable controlling means in an adjusted position.

7. An auxiliary air attachment for internal combustion engines comprising a chamber having air inlet openings at one end and a valve seat at the other end surrounding an outlet opening, a suction-controlled valve controlling passage through the air inlet openings and a mechanically operated valve shiftable toward the seat, a spring urging the suction-controlled valve to its seat, means for adjustably holding the suction-controlled valve away from its seat, and means for locking the mechanically operated valve from longitudinal movement and in adjusted relation to its seat.

8. An auxiliary air attachment for internal combustion engines comprising a chamber having air inlet openings at one end and an outlet opening at the other end, a valve coacting with the outlet opening and having a valve stem passing loosely through the end of the chamber, means for mechanically operating the stem and valve, means for locking the valve stem from longitudinal movement, a suction-operated valve loosely mounted upon the stem and controlling the air inlet openings, a spring surrounding the stem and normally holding the suction valve to its seat, and means for adjustably holding the suction valve from its seat.

9. An auxiliary air attachment for internal combustion engines comprising a chamber having air inlet openings at one end and an outlet opening at the other end, a valve coacting with the outlet opening and having a valve stem passing loosely through the end of the chamber, and normally shiftable therethrough to adjust the valve toward or from its seat, means for mechanically shifting said valve and stem, a relatively fixed split sleeve through which the stem passes, a clamp nut mounted on the sleeve and adjustable thereon to hold the valve stem in operation, a suction-operated valve loose on the stem and controlling the air inlet openings, a spring surrounding the stem and normally holding the suction valve to its seat, and screws passing through the end of said chamber having the air inlet openings and adapted to engage the suction valve to hold it from its seat.

In testimony whereof we hereunto affix our signatures in the presence of two witnesses.

JOHN F. KEEGAN.
ROBERT D. WRIGHT.

Witnesses:
S. W. MINTON,
W. S. CATRON.

It is hereby certified that Letters Patent No. 1,238,523, granted August 28, 1917 upon the application of John F. Keegan and Robert D. Wright, of Damascus, Virginia, for an improvement in "Auxiliary Air Controllers and Heaters," were erroneously issued to the inventors, said Keegan and Wright, and S. W. Minton as assignee of one-fourth interest in said invention, whereas said Letters Patent should have been issued to *said inventors, one-fourth to S. W. Minton, and one-fourth to W. A. Minton*, as shown by the records of assignments in this office; and that the said Letters Patent should be read with this correction therein that the same may conform to the record of the case in the Patent Office.

Signed and sealed this 18th day of September, A. D., 1917.

[SEAL.]

R. F. WHITEHEAD,
*Acting Commissioner of Patents*

Cl. 137—26.